(12) United States Patent
Wang et al.

(10) Patent No.: US 11,640,255 B2
(45) Date of Patent: May 2, 2023

(54) MEMORY DEVICE AND OPERATION METHOD THEREOF

(71) Applicant: MACRONIX INTERNATIONAL CO., LTD., Hsinchu (TW)

(72) Inventors: Wei-Chen Wang, Taipei (TW); Ting-Hsuan Lo, Taipei (TW); Chun-Feng Wu, Taoyuan (TW); Yuan-Hao Chang, Taipei (TW); Tei-Wei Kuo, Taipei (TW)

(73) Assignee: MACRONIX INTERNATIONAL CO., LTD., Hsinchu (TW)

( * ) Notice: Subject to any disclaimer, the term of this patent is extended or adjusted under 35 U.S.C. 154(b) by 37 days.

(21) Appl. No.: 17/518,624

(22) Filed: Nov. 4, 2021

(65) Prior Publication Data
US 2022/0155959 A1    May 19, 2022

Related U.S. Application Data

(60) Provisional application No. 63/115,614, filed on Nov. 19, 2020.

(51) Int. Cl.
*G06F 12/00* (2006.01)
*G06F 3/06* (2006.01)

(52) U.S. Cl.
CPC ............ *G06F 3/064* (2013.01); *G06F 3/0604* (2013.01); *G06F 3/0673* (2013.01)

(58) Field of Classification Search
CPC ...... G06F 3/064; G06F 3/0604; G06F 3/0673; G06F 3/061; G06F 3/0658; G06F 3/0688
See application file for complete search history.

(56) References Cited

U.S. PATENT DOCUMENTS

| 11,507,287 | B1 * | 11/2022 | Hua | ........................ G06F 11/10 |
| 2009/0313523 | A1 * | 12/2009 | Huang | .............. H03M 13/6527 714/752 |

(Continued)

OTHER PUBLICATIONS

Bo Xiang et al., A Fully-Overlapped Multi-Mode QC-LDPC Decoder Architecture for Mobile WiMax Applications, ASAP 2010 IEEE International Conference on Application-specific Systems, Architectures and Processors, pp. 225-232 (Year: 2010).*

*Primary Examiner* — John A Lane
(74) *Attorney, Agent, or Firm* — McClure, Qualey & Rodack, LLP

(57) ABSTRACT

Disclosed is a memory device and an operation method thereof. The operation method of memory device, comprising: programming a plurality of sub-matrices including at least one of non-zero element of a rearranged matrix to a plurality of operation units of the memory device; and programming a mapping table into a working memory of a memory device. The rearranged matrix is generated by rearrange a plurality of columns and a plurality of rows of an original matrix according to the positions of a plurality of non-zero elements of the original matrix. The mapping table comprises a correspondence of row indexes between the original matrix and the rearranged matrix, a correspondence of column indexes between the original matrix and the rearranged matrix and a correspondence between the sub-matrices including at least one non-zero element and the operation units storing the sub-matrices including at least one non-zero element.

10 Claims, 9 Drawing Sheets

(56) References Cited

U.S. PATENT DOCUMENTS

| | | | |
|---|---|---|---|
| 2015/0199266 A1* | 7/2015 | Franchetti | G06F 15/76 |
| | | | 711/117 |
| 2017/0060811 A1* | 3/2017 | Yang | G06F 17/16 |
| 2018/0040367 A1* | 2/2018 | Wu | G06F 3/0608 |
| 2021/0326051 A1* | 10/2021 | Diril | G06F 3/0673 |
| 2022/0255563 A1* | 8/2022 | Jin | H03M 13/616 |

* cited by examiner

MEMORY DEVICE AND OPERATION METHOD THEREOF

This application claims the benefit of US provisional application Ser. No. 63/115,614, filed Nov. 19, 2020, the subject matter of which is incorporated herein by reference.

BACKGROUND

Field

The present disclosure relates to a memory device and an operation method thereof.

Description of the Related Art

Memory device could be applied to perform various mathematical calculations such as convolution and sum of product. Applying memory device to perform these calculations has advantages of high speed and high parallel computing ability. However, limited by hardware architecture of memory device, the calculations would be performed in minimum unit of "operation unit". For some data type, for example, sparse matrix, to be calculated, such limitation would lead to the waste of computing resource.

SUMMARY

An embodiment of the present disclosure discloses a memory device, comprising a plurality of blocks, a working memory and a memory controller.

Each of the blocks comprises a plurality of operation units Each of the operation units comprises a plurality of memory cells. The working memory comprises a mapping table. The memory controller is coupled to the blocks and the working memory, and configured to operate the blocks to perform calculation based on a plurality of sub-matrices including at least one non-zero element of an rearranged matrix according to the mapping table. The rearranged matrix is generated by rearrange a plurality of columns and a plurality of rows of an original matrix according to the positions of a plurality of non-zero elements of the original matrix. The operation units are programmed according to the sub-matrices including at least one non-zero element of the rearranged matrix. The mapping table comprises a correspondence of row indexes between the original matrix and the rearranged matrix, a correspondence of column indexes between the original matrix and the rearranged matrix and a correspondence between the sub-matrices including at least one non-zero element and the operation units storing the sub-matrices including at least one non-zero element.

Another embodiment of the present disclosure discloses an operation method of memory device, comprising: programming a plurality of sub-matrices including at least one of non-zero element of a rearranged matrix to a plurality of operation units of the memory device; and programming a mapping table into a working memory of a memory device. The rearranged matrix is generated by rearrange a plurality of columns and a plurality of rows of an original matrix according to the positions of a plurality of non-zero elements of the original matrix. The mapping table comprises a correspondence of row indexes between the original matrix and the rearranged matrix, a correspondence of column indexes between the original matrix and the rearranged matrix and a correspondence between the sub-matrices including at least one non-zero element and the operation units storing the sub-matrices including at least one non-zero element.

The above and other aspects of the invention will become better understood with regard to the following detailed description of the preferred but non-limiting embodiment(s). The following description is made with reference to the accompanying drawings.

DETAILED DESCRIPTION

Figure 1:
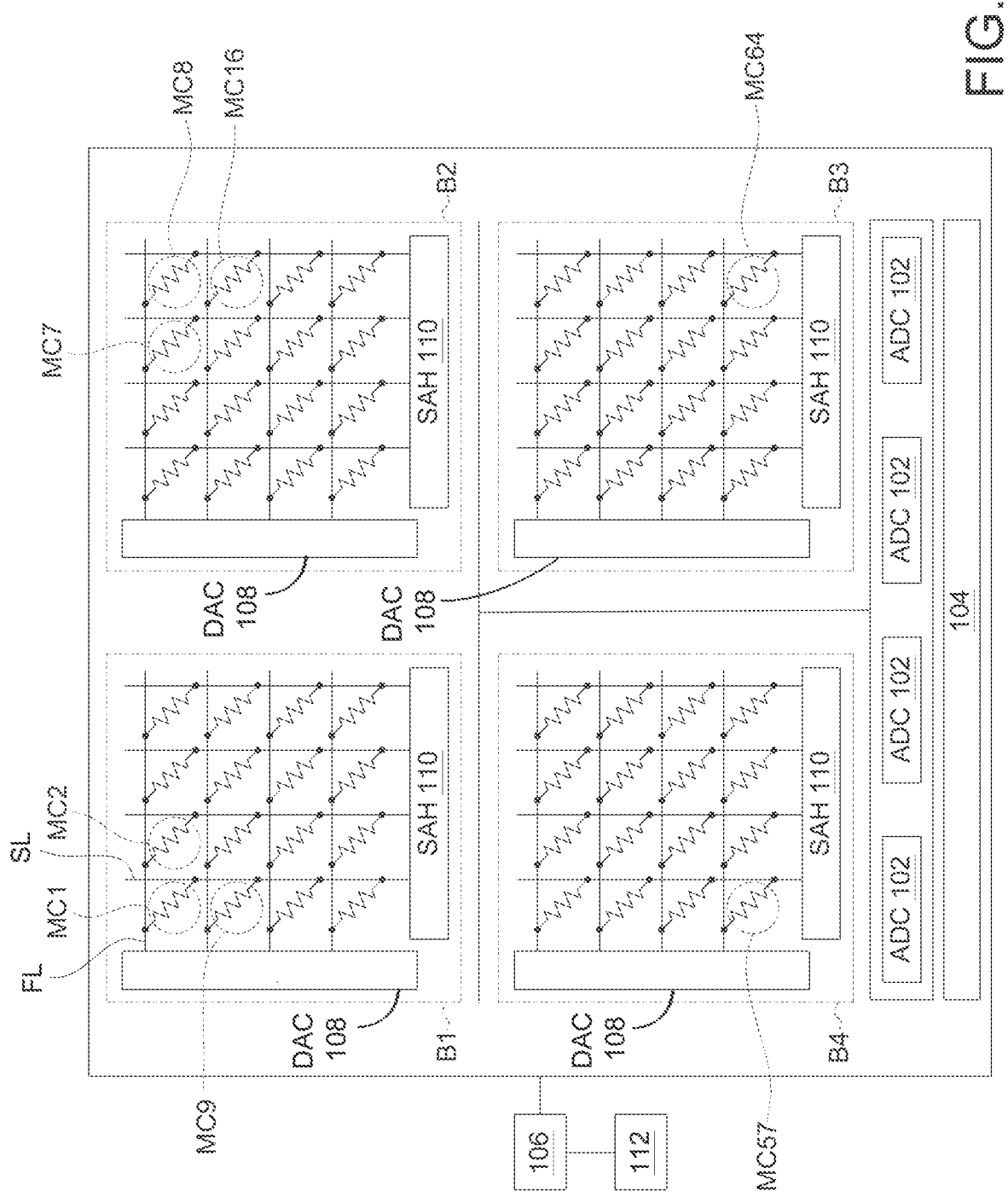
FIG. 1 shows a block diagram of memory device according to an embodiment of the present disclosure.

Referring to FIG. 1, FIG. 1 shows a block diagram of memory device according to an embodiment of the present disclosure. The memory device 10 includes a number of blocks B1~B4, a number of analog to digital converters (ADC) 102, an adding circuit 104, a memory controller 106 and a working memory 112. The blocks B1~B4 includes a number of memory cells MC1~MC64, a number of first signal lines FL, a number of second signal lines SL, a digital to analog converter (DAC) 108 and a sampling and hold (SAH) circuit 110. Each of the memory cells includes a resistor with a variable resistance which is able to be programmed. For each of the memory cells, a first terminal of the resistor is coupled to the DAC 108 via one of the first signal lines FL, and a second terminal of the resistor is coupled to the SAH circuit 110 via one of the second signal lines SL. The DAC 108 is configured to converter digital signals representing input values to analog signals, for example, voltage signals, for inputting to the first signal lines FL. The SAH circuit 110 is configured to sense and record the currents flow out from the second signal lines based on a timing signal (or a clock signal), and then output a summed current value.

The ADCs 102 are respectively coupled to the SAH circuits. The ADCs 102 are configured to convert the summed current values output by the corresponding SAH circuit 110 to digital signals representing digital values. The adding circuit 104 is coupled to the ADCs 102, and is configured to sum the digital values represented by the digital signals output by the ADCs 102. The memory controller 106 is coupled to the DACs 108, the SAH circuits 110, the ADCs 102 and the adding circuit 104. The memory controller 106 is configured to control the behavior and operations of the DACs 108, the SAH circuits 110, the ADCs 102 and the adding circuit 104 by signals. The working memory 112 is coupled to or embedded in the memory controller 106. The working memory 112 is configured to store a mapping table. The detail of the mapping table would be described hereafter.

Figure 2:
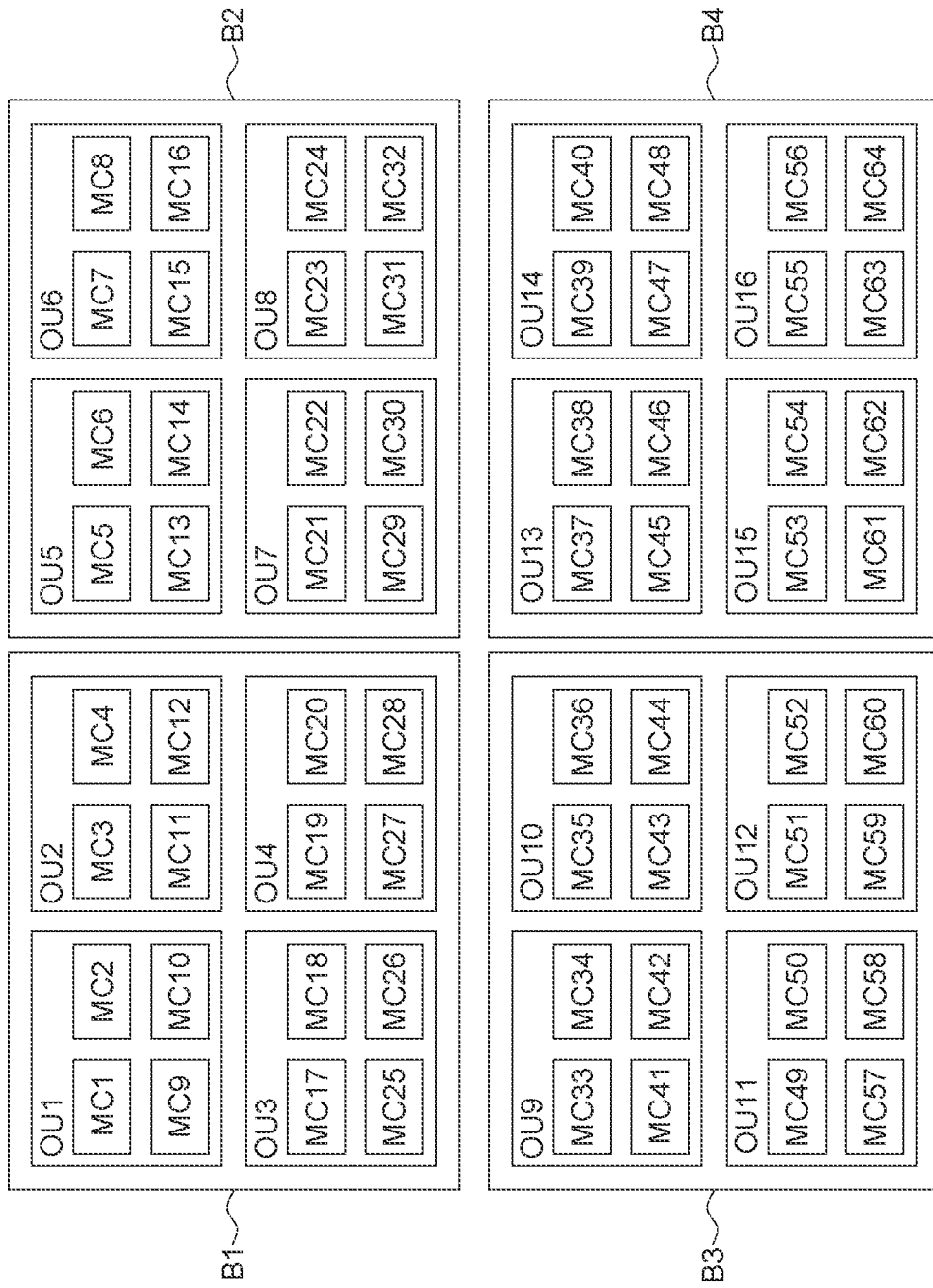
FIG. 2 shows a block diagram of operation units according to an embodiment of the present disclosure.

Referring to FIG. 2, FIG. 2 shows arrangement of operation units of the memory device according to an embodiment of the present disclosure. When the memory device 10 is used for calculating, the calculation would be performed in unit of operation unit. As shown in FIG. 2, the memory cells of the memory device 10 is configured as a number of operation units OU1-OU16.

These operation units OU1-OU16 may not be used for calculating simultaneously. For example, in a first clock cycle, the first signal lines corresponding to the operation units OU1, OU5, OU9 and OU13 would be applied voltage signals representing input values. The SAH circuits would sample and record the current sensed in the first clock cycle. In a second clock cycle, the first signal lines corresponding to the operation units OU2, OU6, OU10 and OU14 would be applied voltage signals representing input values. The SAH circuits would sample and record the current sensed in the first clock cycle. In the third clock cycle and the fourth clock cycle, it would be the operation units OU3, OU7, OU11 and OU15 and the operation units OU4, OU8, OU12 and OU16 respectively. In an embodiment, each of the SAH circuits 110 would sum up the current sensed in different clock cycle for each of the second signal lines, and then output the total current corresponding to each of the second signal lines to the ADCs 102. In another embodiment, the SAH circuits 110 would output the sensed current corresponding to each of the second signal lines in each clock cycle to the ADCs 102. The converted values corresponding to the sensed current corresponding to the second signal lines in each clock cycle would be further calculated according to a predetermined algorithm by the adding circuit 104.

Figure 3:
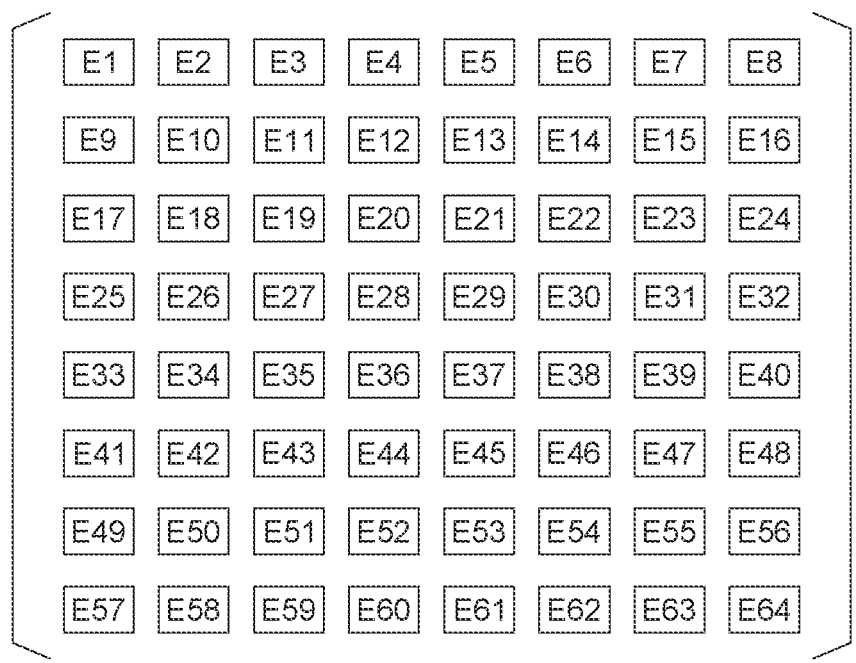
FIG. 3 shows a schematic diagram of an original matrix.

Conventionally, in order to represent a matrix, the memory cells would be programmed to one-to-one map the elements of the matrix, as shown in FIG. 3. For example, the memory cell MC1 is programmed to represent the element E1, the memory cell MC2 is programmed to represent the element E2, the memory cell MC64 is programmed to represent the element E64, and so on. However, in some cases, the matrix may be a sparse matrix which has a great amount of zero elements. Moreover, the distribution of non-zero elements may be very scattered. A matrix for representing the connection between the users of a social network is a typical example. For calculations based on such kind of matrices, it is possible that all the memory cells in many of the operation units would be programmed to represent 0. Computing resource of these operation units is actually wasted. In order to improve the usage efficiency of computing resource, the embodiment of the present disclosure rearranges the matrix and establishes the mapping table in the memory device.

Figure 4:
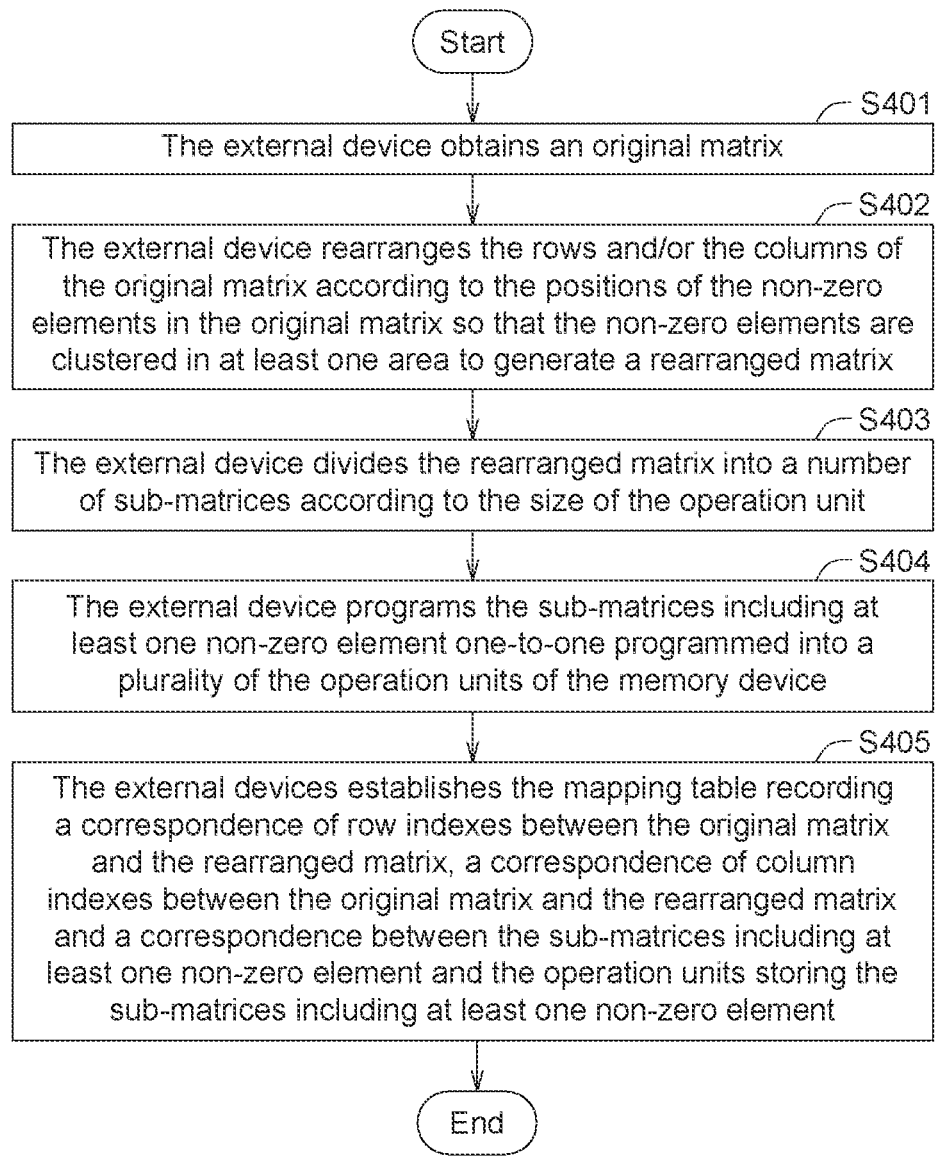
FIG. 4 shows a flowchart of operation method of memory device according to an embodiment of the present disclosure.

Referring to FIG. 4, FIG. 4 shows a flowchart of a method for establishing a mapping table in a memory device according to an embodiment of the present disclosure. The method would be performed by an external computing device such as a computer coupled to the memory device.

At step S401, the external device obtains the original matrix. The original matrix has a number of rows and a number of columns.

At step S402, the external device rearranges the rows and/or the columns of the original matrix according to the positions of the non-zero elements in the original matrix so that the non-zero elements are clustered in at least one area to generate a rearranged matrix. In an embodiment, the non-zero elements are clustered in the upper right and lower left corners of the rearranged matrix. In another embodiment, the non-zero elements are clustered in the lower right and upper left corners of the rearranged matrix. In yet another embodiment, In an embodiment, the non-zero elements are clustered in the central area of the rearranged matrix. There are various approaches for generating the rearranged matrix. Noted that the rearranged matrices generated by different approaches may be different. Two examples of generating the rearranged matrix would be provided hereafter. However, the present disclosure does not limit the approach for generating the rearranged matrix.

The first exemplary approach is using the external device to calculate the matrices generated by all possible combinations of the row indexes and the column indexes, and selects one of them as the rearranged matrix. Although this approach is intuitive, it is computationally intensive.

Figure 5:
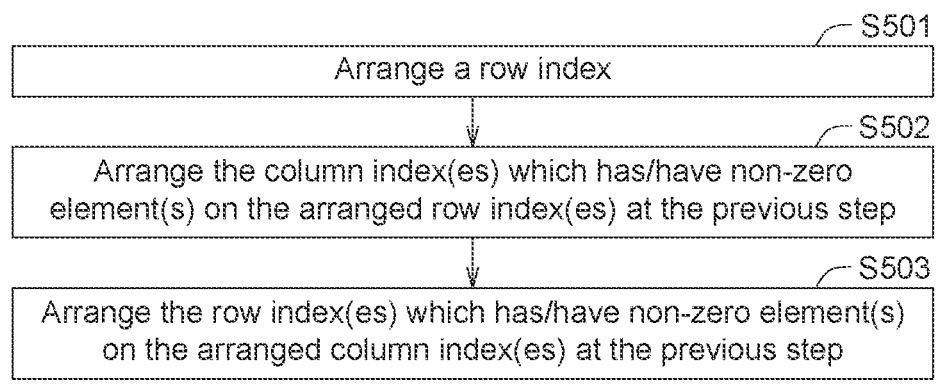
FIG. 5 shows a flowchart of generating an rearranged matrix according to an embodiment of the present disclosure.

The second exemplary approach would be described with FIG. 5 and FIGS. 6A~6H. FIG. 5 shows a flowchart of an approach for generating the rearranged matrix according to an embodiment of the present disclosure. FIGS. 6A~6H show schematic diagrams of the generation of the rearranged matrix.

Figure 6A:
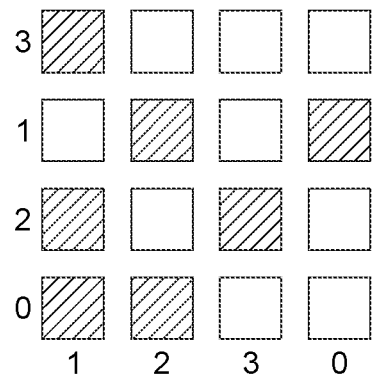
FIGS. 6A-6H show schematic diagrams of generating of rearranged matrix.

The original matrix is shown in FIG. 6A, wherein the slashed boxes represent non-zero elements, and the blank boxes represent zero elements. At the beginning, the index of the columns and the rows of the rearranged matrix would be initialized to an unarranged state.

Figure 6B:
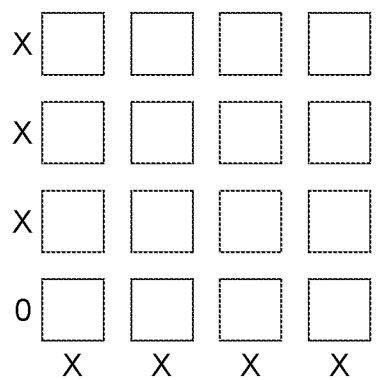

At step S501, arrange a row index. The first row index could be chosen randomly. The row index 0 could be arranged at the bottom of the matrix, as shown in FIG. 6B.

Figure 6C:
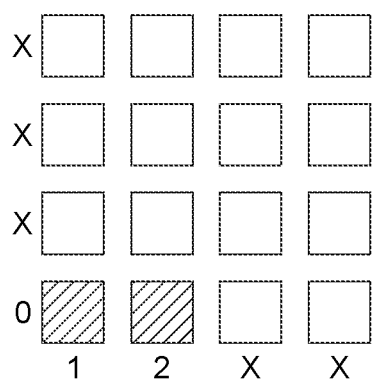

At step S502, arrange the column index(es) which has/have non-zero element(s) on the arranged row index(es) at the previous step. On the row index 0, the column indexes 1 and 2 have non-zero elements. Therefore, the column indexes 1 and 2 are arranged one-by-one from the leftmost side of the rearranged matrix, as shown in FIG. 6C.

Figure 6D:
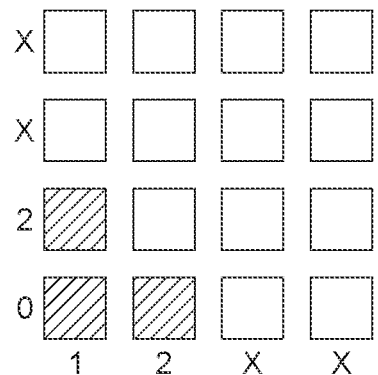
Figure 6E:
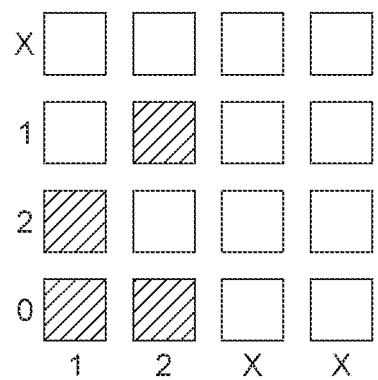

At step S503, arrange the row index(es) which has/have non-zero element(s) on the arranged column index(es) at the previous step. On the column index 1, the column indexes 0 and 2 have non-zero elements. However, since the row index 0 has been arranged, it would not be arranged repeatedly. Therefore, the column index 2 is arranged, as shown in FIG. 6D. On the column index 2, the column indexes 0 and 1 have non-zero elements. Similarly, since the row index 0 has been arranged, it would not be arranged repeatedly. Therefore, the column index 1 is arranged, as shown in FIG. 6E.

Figure 6F:
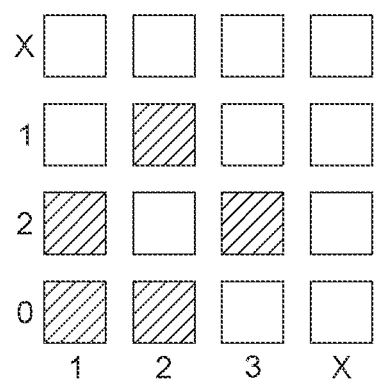
Figure 6G:
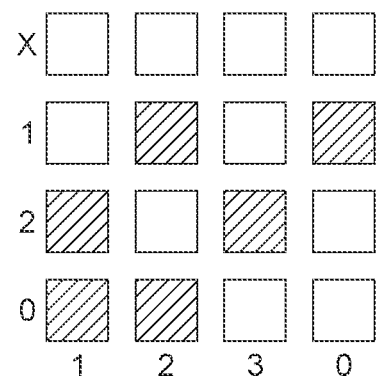
Figure 6H:
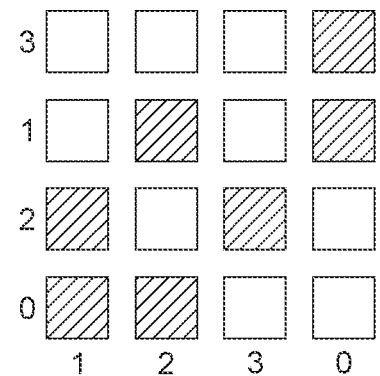

Repeat steps S502 and S503 alternately until all the column indexes and the row indexes are arranged, as shown in FIGS. 6F~6H. FIG. 6H shows the rearranged matrix which is finally generated. It could be found that, compared with the original matrix, the non-zero elements in the rearranged matrix are more clustered. This effect is more pronounced when the dimensions of the original matrix are large and the density is low.

Back to FIG. 4, at step S403, the external device divides the rearranged matrix into a number of sub-matrices according to the size of the operation unit. For example, in memory device 10, the size of the operation unit is 2×2, a 8×8 rearranged matrix shown in FIG. 6A would be divided into sixteen 2×2 sub-matrices, as shown in FIG. 6B. In this embodiment, each of the sub-matrices would be given a respective index for representing the position thereof.

Figure 7:
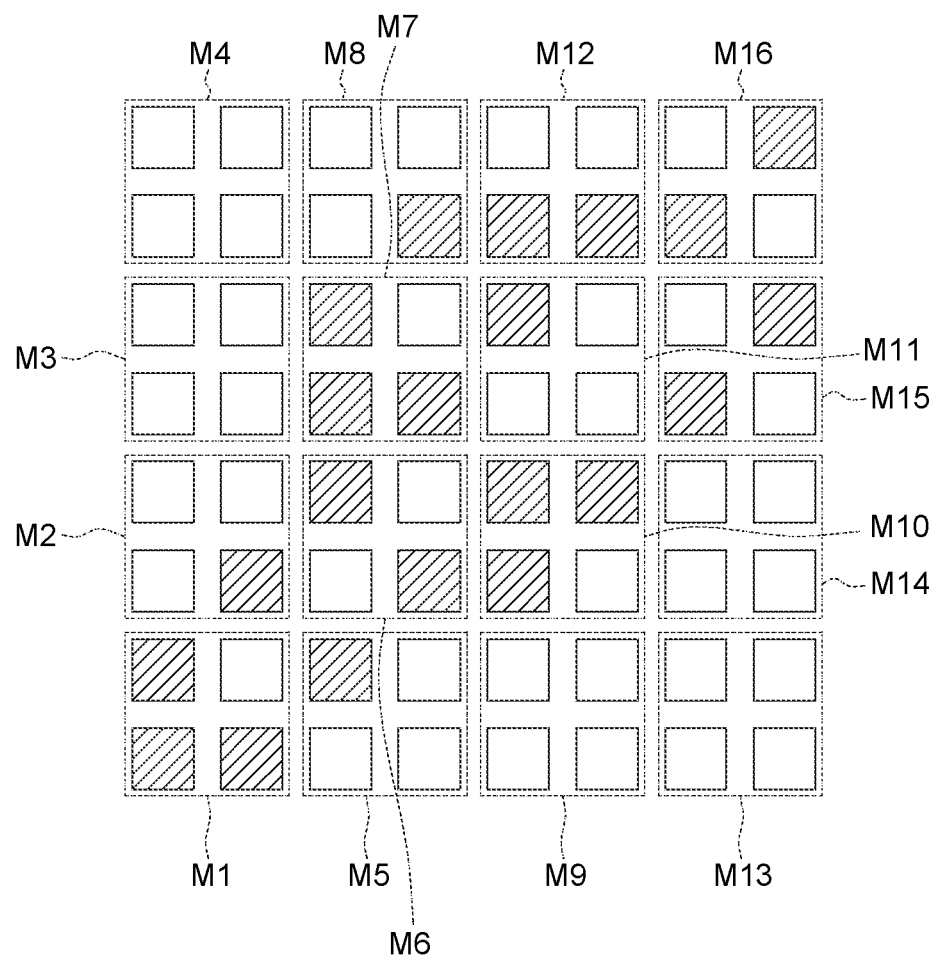
FIG. 7 shows schematic diagram of sub-matrices.

At step S404, the external device programs the sub-matrices including at least one non-zero element one-to-one programmed into a plurality of the operation units of the memory device. As shown in FIG. 7, the indexes of the sub-matrices including at least one non-zero element are M1, M2, M5, M6, M7, M8, M10, M11, M12, M15 and M16. For example, the sub-matrix M1 could be programmed into the operation unit OU1, the sub-matrix M2 could be programmed into the operation unit OU5, the sub-matrix M5 could be programmed into the operation unit OU9, the sub-matrix M6 could be programmed into the operation unit OU13, the sub-matrix M7 could be programmed into the operation unit OU2, the sub-matrix M8 could be programmed into the operation unit OU6, the sub-matrix M10 could be programmed into the operation unit OU10, the sub-matrix M11 could be programmed into the operation unit OU14, the sub-matrix M12 could be programmed into the operation unit OU3, the sub-matrix M15 could be programmed into the operation unit OU7, and the sub-matrix M16 could be programmed into the operation unit OU11. Noted that the elements of each of the sub-matrices including at least one non-zero element would be programmed into the memory cells of the operation units correspondingly. The is, the programming would be performed in row-to-row and column-to-column to maintain the positional relationship among the elements of each of the sub-matrices including at least one non-zero element.

At step S405, the external devices establishes the mapping table recording a correspondence of row indexes between the original matrix and the rearranged matrix, a correspondence of column indexes between the original matrix and the rearranged matrix and a correspondence between the sub-matrices including at least one non-zero element and the operation units storing the sub-matrices including at least one non-zero element. The external device stores the mapping table into the working memory of the memory device.

The mapping table would be used by the memory controller to command the DACs to apply the correct voltages on the first signal lines for the operation units when performing calculation. For example, if the memory device is used for multiplying a row matrix by the original matrix of the rearranged matrix. Since the row index of rearranged matrix may have been different from the original matrix, in order to multiply the elements of row matrix with the corresponding elements of the rearranged matrix based on the rule of matrix multiplication, the column index of the row matrix should be rearranged accordingly. To reflect the rearrangement of the column index of the row matrix, the input voltage of the operation units need to be adjusted accordingly. Therefore, in order to comply the rule of matrix multiplication, the memory controller would command the DACs to correctly apply voltages representing the elements of the row matrix for the operation units by referring to the correspondence of row indexes between the original matrix and the rearranged matrix and the correspondence between the sub-matrices including at least one non-zero element and the operation units storing the sub-matrices including at least one non-zero element. Furthermore, the memory controller may command the SAH circuits and/or the adding circuit to sum up the currents flow out from the second signal lines and/or the output values of the ADCs according to the correspondence of column indexes between the original matrix and the rearranged matrix and a correspondence between the sub-matrices including at least one non-zero element and the operation units storing the sub-matrices including at least one non-zero element recorded in the mapping table, in order to obtain the correct result based on the rule of the matrix multiplication.

In the example of FIG. 7, only eleven operation units are needed to perform calculations in the method of the present disclosure. Compared with the conventional approach, the computing resource of five operation units could be saved. The saved computing resource could be used for other calculations, or not used for the purpose of saving power consumption. When the dimension of the matrix is large and the density is low, the effect of saving computing resources would be more significant.

While the dimensions of the original matrix are very large and the density is very low, the effect of saving computing resources would be more significant.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:
1. A memory device, comprising:
a plurality of blocks, each of the blocks comprising a plurality of operation units, each of the operation units comprising a plurality of memory cells;
a working memory, comprising a mapping table; and
a memory controller, coupled to the blocks and the working memory, and configured to operate the blocks to perform calculation based on a plurality of sub-matrices including at least one non-zero element of a rearranged matrix according to the mapping table,
wherein the rearranged matrix is generated by rearranging a plurality of columns and a plurality of rows of an original matrix according to the positions of a plurality of non-zero elements of the original matrix, the operation units are programmed according to the sub-matrices including at least one non-zero element of the rearranged matrix, and the mapping table comprises a correspondence of row indexes between the original matrix and the rearranged matrix, a correspondence of column indexes between the original matrix and the rearranged matrix and a correspondence between the sub-matrices including at least one non-zero element and the operation units storing the sub-matrices including at least one non-zero element.

2. The memory device according to claim 1, wherein each of the blocks comprises a digital to analog converter (DAC) coupled to the operation units via a plurality of first signal lines, and a sensing and hold (SAH) circuit coupled to the operation units via a plurality of second signal lines; and
wherein the memory controller is configured to command the DACs to apply voltages representing a plurality of input values to the first signal lines according to the correspondence of row indexes between the original matrix and the rearranged matrix and the correspondence between the sub-matrices including at least one non-zero element and the operation units storing the sub-matrices including at least one non-zero element in the mapping table.

3. The memory device according to claim 2, further comprising:
a plurality of analog to digital converters (ADCs), coupled to the SAH circuit; and
an adding circuit, coupled to the ADCs,
wherein the memory controller is configured to command the SAH circuits and/or the adding circuit to sum up the currents flow out from the second signal lines and/or the output values of the ADCs according to the correspondence of column indexes between the original matrix and the rearranged matrix and a correspondence between the sub-matrices including at least one non-zero element and the operation units storing the sub-matrices including at least one non-zero element in the mapping table.

4. The memory device according to claim 1, wherein the rearrange matrix is generated by: calculating the matrices generated by all possible combinations of the rows and the columns of the original matrix; and selecting one of them as the rearranged matrix.

5. The memory device according to claim 1, wherein the rearrange matrix is generated by:
(step a) arranging a row index;
(step b) arranging the column index(es) which has/have non-zero element(s) on the arranged row index(es) at the previous step;
(step c) arranging the row index(es) which has/have non-zero element(s) on the arranged column index(es) at the previous step; and
(step d) repeating steps (step b) and (step c) alternately until all the column indexes and the row indexes have been arranged.

6. The memory device according to claim 1, wherein the dimensions of sub-matrices are determined according to the size of the operation units.

7. The memory device according to claim 1, wherein the operation units are free of being programmed according to the sub-matrices including none of non-zero elements of the rearranged matrix.

8. An operation method of memory device, comprising:
programming a plurality of sub-matrices including at least one of a non-zero element of a rearranged matrix to a plurality of operation units of the memory device; and
programming a mapping table into a working memory of a memory device,
wherein the rearranged matrix is generated by rearranging a plurality of columns and a plurality of rows of an original matrix according to the positions of a plurality of non-zero elements of the original matrix, and the mapping table comprises a correspondence of row indexes between the original matrix and the rearranged matrix, a correspondence of column indexes between the original matrix and the rearranged matrix and a correspondence between the sub-matrices including at least one non-zero element and the operation units storing the sub-matrices including at least one non-zero element.

9. The operation method according to claim 8, further comprising:
commanding a plurality of digital to analog converters (DACs) of the memory device to apply voltages representing a plurality of input values to the operation units according to the mapping table.

10. The operation method according to claim 8, further comprising:
commanding a plurality of sensing and hold (SAH) circuits and/or an adding circuit of the memory device to sum up the currents flow out from a plurality of signal lines coupled to the operation units and/or the output values of a plurality of analog to digital converters (ADCs) coupled to the adding circuit according to the mapping table.

* * * * *